United States Patent [19]

Pasciak

[11] Patent Number: 4,808,000
[45] Date of Patent: Feb. 28, 1989

[54] POSITIONING DEVICE AND METHOD

[75] Inventor: Robert L. Pasciak, Decatur, Tex.

[73] Assignee: Union Oil Company of California, Los Angeles, Calif.

[21] Appl. No.: 919,235

[22] Filed: Oct. 15, 1986

[51] Int. Cl.$^4$ .................. G01B 11/14; G01B 11/00
[52] U.S. Cl. ...................................... 356/375; 356/400
[58] Field of Search .................. 356/375, 399, 400

[56] References Cited

U.S. PATENT DOCUMENTS

| | | | |
|---|---|---|---|
| 3,749,500 | 7/1973 | Carlson et al. | 356/156 |
| 3,812,376 | 5/1974 | Takeyama et al. | 250/572 |
| 3,907,439 | 9/1975 | Zanoni | 356/375 OR |
| 3,922,094 | 11/1975 | Colding et al. | 356/375 OR |
| 4,009,965 | 3/1977 | Pryor | 356/109 |
| 4,365,301 | 12/1982 | Arnold et al. | 364/475 |
| 4,502,823 | 3/1985 | Wronski et al. | 356/375 X |
| 4,523,850 | 6/1985 | Covey et al. | 356/400 X |
| 4,585,379 | 4/1986 | Nagayama et al. | 409/147 |

FOREIGN PATENT DOCUMENTS 8333604 12/1983 United Kingdom ................ 356/400

*Primary Examiner*—R. A. Rosenberger
*Assistant Examiner*—Steve McGowan
*Attorney, Agent, or Firm*—G. Wirzbicki

[57] ABSTRACT

An apparatus for establishing a desired position of a tool, including a means for moving the tool along a particular axis, a laser for providing a beam of coherent light along an axis which intersects the axes of tool movement and which is located so that the tool can block at least a portion of the beam, a detector of beam blockage, and a controller for tool movement which can respond to signals from the detector.

30 Claims, 1 Drawing Sheet

POSITIONING DEVICE AND METHOD

INTRODUCTION TO THE INVENTION

The present invention relates to tools and, more particularly, to the initial positioning of tools before contact with a workpiece.

Machine tools are very commonly used in the commercial world for drilling, cutting, shaping, and many other operations on a diversity of materials. Also quite common are numerically controlled machine tools, which can be programmed to very accurately displace a tool in one or more desired directions, for one or more desired distances, to perform operations without operator intervention on a normally stationary workpiece.

Critical to the success of numerically controlled machines is an accurate initial positioning of the tool or, in the case of a stationary tool and moveable workpiece, the workpiece. With many machines, this positioning is accomplished manually by an operator, who must incrementally move the tool in relation to the workpiece, until a gauging device indicates a desired spacing. This procedure is time consuming and subject to interpretive errors, but must be repeated at regular intervals to compensate for tool wear and many other sources of positioning error. Of course, if the individual workpieces are not dimensionally uniform, the positioning must be performed for each workpiece.

Accurate positioning is not exclusively a requirement for machine tools. Numerous automated or semi-automated industrial operations, including welding, cutting, sawing, grinding, turning, and many others, cannot be properly performed unless the initial position of a tool or workpiece (or both) is known within a particular tolerance.

For many years, automated positioning of a tool has been achieved using devices called "probes," which are mounted on a machine in place of the tool or are rigidly mounted in a fixed relationship to the tool. These probes usually comprise a stylus which generates an electrical signal when it contacts an object, such as a workpiece. By providing appropriate electrical circuitry, the programmer for a numerically controlled machine can recognize this signal and, from its internally generated tool positional information, more or less accurately set a desired initial position for the tool. An important limitation of probe devices is the lack of an ability to readily compensate for error-causing factors, such as tool wear. Also, since the position of the probe is not usually exactly that of the tool, some error is introduced; the error can be unacceptable for work having very close tolerances.

SUMMARY OF THE INVENTION

The invention encompasses an apparatus for establishing an initial position of a tool or workpiece, including: (a) a means for positioning the tool or workpiece along a particular axis; (b) a means for providing a beam of coherent light along an axis which intersects the axis of (a), and located so that the tool or workpiece can be positioned to at least partially block the beam; (c) a means for sensing beam blockage; and (d) a means for receiving a signal from the beam blockage sensing means and controlling the tool or workpiece positioning means in response to the signal. If positioning is required on more than two axes, similar equipment must be provided for each additional axes. Further, equipment can be provided for individually positioning both a tool and a workpiece, as desired.

The invention also encompasses a method for initially disposing a plurality of tools or workpieces along their respective parallel axes, including the steps of: (a) positioning a first tool or workpiece along its axis until the tool at least partially blocks a beam of coherent light having an axis perpendicular to the parallel axes; (b) positioning the tool or workpiece to a point at which the beam just becomes unblocked; and (c) sequentially repeating steps (a) and (b) for each remaining tool. This method can conveniently be performed using the above-described apparatus.

DETAILED DESCRIPTION OF THE INVENTION

Figure 1:
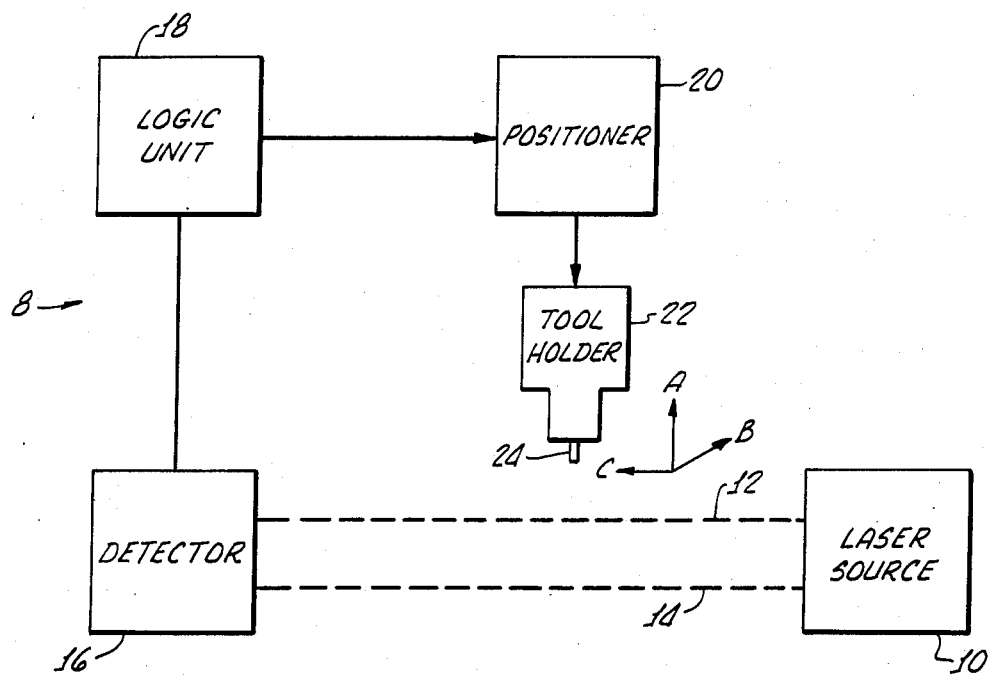
FIG. 1 is a block diagram showing major components of the tool-positioning apparatus of the present invention.

The present invention is an apparatus 8 and method for initially positioning a tool or workpiece, or both, particularly for automated or semi-automated operations on the workpiece. Although the following discussion will focus on machine tool applications of the invention, it is to be understood that the invention is not restricted thereto, since the invention is applicable to the positioning of a diversity of tools, including drills, grinding wheels, saw blades, welding rods, laser cutters or welders, and many others.

A description of one embodiment of apparatus 8 of this invention can be made with reference to FIGS. 1 and 2, wherein laser source 10 is shown as providing both a primary beam 12, and an optional reference beam 14, of coherent light, as is more particularly described below.

Laser source 10 can be a gas laser, a solid-state laser, a dye laser, a semiconductor laser, or a laser of any other type. Typically, it will only be necessary to provide a light output less than 1 watt, more usually less than about 50 milliwatts, depending upon the distance of light travel and the sensitivity of light detectors used. Laser light in the visible range of wavelengths will normally be preferred over light in the ultraviolet or infrared ranges, since beam alignment can be more easily performed by an operator, when visible light is used.

In addition to a laser tube or other generator of coherent light, laser source 10 can include various optical components, as required for a particular application. To assist in compensating for error-introducing factors such as light output drifting, dust in the path of the light beams, and the like, it will frequently be desirable to divide the coherent light into two beams, one of which will be the working, or primary, beam 12, while the other will be the reference beam 14. This can be accomplished using beam splitting optical components (not shown) which are well known in the art.

Preferred beam splitters are reflecting prisms which transmit approximately half of their exit light intensity along the axis of the incident light, while transmitting the other half of the exit light intensity at a right angle to the incident light axis. A mirror or prism can be placed in the right angle beam to redirect this beam along an axis parallel to that of the incident light. The parallel beams should be displaced such that reference beam 14 will not be interrupted during operation of the machine, while the primary beam 12 is situated such that it can be at least partially obstructed by a tool or workpiece.

In addition to these optical elements, lenses and other components (also not shown) can be placed in coherent light beams, should it be desired to further focus or alter the beams.

Light intensity is converted into an electrical signal by detector 16, which can comprise any known detection device, such as a photocell, a phototube, a photomultiplier, a photodiode, or a phototransistor, with associated electrical circuitry to operate the device, for each beam of coherent light. Typically, detector 16 will include a slit or pinhole orifice (not shown) which can be made of different sizes to adjust the amount of light which reaches the detection device. Lenses or other devices can be included for focusing or otherwise altering light beams 12 and 14, as desired.

When both a primary beam 12 and a reference 14 beam are used, detector 16 should include a comparator circuit, (not shown) which produces either a ratio or difference signal from signals produced by the individual detection devices. Suitable comparator circuitry is well known in the art.

Output from detector 22 will be an analog signal of a desired amplitude and polarity, which will change from an initial value (for an unblocked primary light beam) depending upon the degree of beam blockage which exists. This signal is conducted to logic a unit 18 which responds to the change amplitude and/or polarity and generates control signals for changing the position of a tool or workpiece.

Suitable logic units 18 include the numerical controller units such as those which are available from Allen-Bradley Co., Cincinnati Milacron, and many others, for automating machine tools. These devices typically are programmable microcomputers which can be made to execute complex programs for movement of a tool along one, two, three, or more axes, at rates and to locations specified by the programmer. Frequently, such logic units 18 will require digital input signals; the output from detector 16 can be conditioned by any of the well-known analog-to-digital converter circuits, which can conveniently be incorporated into either the detector or the logic unit.

Signals generated by logic unit 18 are directed to positioner 20, which responds to the signals with movements of a tool holder or workpiece holder such as spindle 22. Typically, positioner 20 will comprise separate components, such as servomotors or stepping motors (not shown), for each axis which is to be controlled. Positioners 20 can be provided on, for example, a machine tool such that spindle 20 can be moved to preselected locations in the X, Y, and/or Z axes, while the workpiece table 24 (FIG. 2) is provided with positioners 26, 28, and 30 for movement in the respective X, Y and Z axes. In this example, it may be advisable to provide separate laser sources 10, detectors 10, logic units 10, and their associated accessories for both spindle 22 and an associated workpiece 32 (FIG. 2), although such are not shown for the workpiece.

Figure 2:
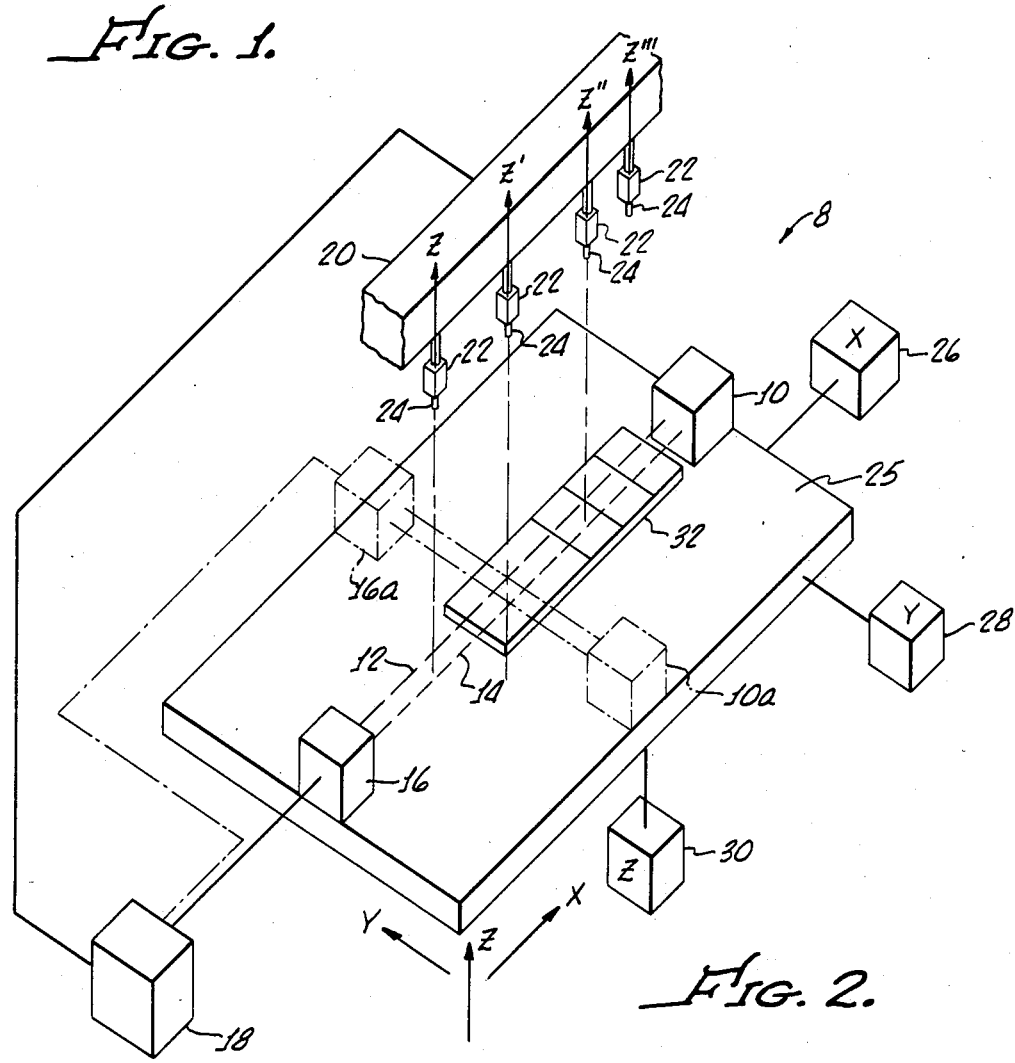
FIG. 2 is a perspective drawing showing, in pictorial form, the apparatus of FIG. 1.

As shown in FIGS. 1 and 2, positioner 20 is mechanically coupled to the tool holder 22, which itself is mechanically coupled to a tool 24. To operate the device of this invention, the tool 24 (in its holder 22) is moved by positioner 20, until the detector 16 senses blockage of primary beam 12. If very accurate positioning is required, logic unit 18 must be made to respond to very small changes in signal obtained from the detector 16. When blockage is recognized by detector, logic unit 18 causes positioner 20 to move in a direction opposite to its initial direction, until a point is reached where no beam blockage is detected. By stopping the movement of tool 24 at this point, an accurate positioning in two axes can be obtained with one laser beam. For example, tool holder 22 and tool 24 can be lowered below the known or observable general height of beam 12 and be moved in horizontally, along the Y axis (FIG. 2) until the beam 12 is contacted, thereby establishing the Y-axis location of the beam. After beam 12 has been located along the Y-axis in this manner, holder 22 and tool 24 can be positioned in the vertical plane of the beam and can be elevated above the known or observed general height of the beam height. Then, holder 22 and tool 24 can be lowered, as above-described, until beam 12 is contacted.

This same system can be made to efficiently position a plurality of tools 24, using a single laser source 10 and detector 16, when the tools are to be positioned along parallel axes. For this embodiment, logic unit 18 must be capable of sequentially addressing each of holders 22 for tools 24, and the primary laser beam 12 must be perpendicular to the parallel axes. A first tool 24 can be positioned, using the aforementioned procedure, and, after it no longer blocks laser beam 12, a second tool 24 can be positioned. This will be continued for the remaining tools 24. Workpieces 32 can be aligned in the same manner.

The following example is illustrative of various aspects of the invention and is not intended to limit the invention, the scope of the invention being fully defined by the appended claims.

EXAMPLE

A ten-spindle drilling machine 8a (FIG. 2) is modified for automatic tool positioning, according to the present invention (only four spindles 22 being shown in FIG. 2). Each of spindles 22 is provided with a stepping motor (not shown) for positioning in the Z axis (extending vertically, perpendicular to machine table 25), and with servomotors (not shown) with feedback for accurate positioning in the X and Y axes (the width and depth of the table, respectively). Programmed control of the stepping motors and servomotors is provided by a "Bandit 1 CNC" machine controller 20, marketed by Allen-Bradley Co. of Highland Heights, Ohio. Controller 20 is able to address individual spindles 22 or any combination thereof, and can control movement in the X, Y, and Z axes.

Mounted at one end of a table 25 is a laser source 10, comprising a helium-neon polarized laser head (approximately 2 milliwatts output power), with a beam splitter and reflecting prism (none of which are shown) to direct approximately half of the laser intensity as second (or reference) beam 14, parallel to, but displaced approximately 4 inches from, primary beam 12. Laser source 10 is located to provide parallel beams 12 and 14 approximately 5 inches above workpiece holders 32 which are mounted on top of table 25, with primary beam 12 located within the Y-axis travel area of the spindle and the reference beam located outside of this travel area, where there will be no obstruction during operation of machine 8a.

At the opposite end of the table 25 is a detector 16, located so that each laser beam 12 and 14 will fall upon a 5 micrometers diameter pinhole, which pinholes are in removable plates mounted in the housing of the detector. Behind each pinhole is a phototransistor, the output of which is amplified by an operational amplifier (neither of which is shown). Outputs from the amplifiers are directed to a difference amplifier (logic unit 18), the output of which is conducted through an optical isolator to the machine controller 20.

In operation, a drill 24 is placed in each spindle 22 and the machine controller 20 is programmed to move a first each one of the drills in the Y-axis to a point directly above the primary beam 12, then lower the drill along the Z axis in 0.500 inch increments until beam blockage is detected. Drill 24 is then raised 0.500 inches and lowered in 0.100 inch increments until beam blockage is detected. After raising drill 24 0.100 inches, this incremental lowering and raising is repeated with 0.050 inch, 0.010 inch, and then 0.001 inch increments. Finally, drill 24 is lowered in 0.0001 inch increments until beam blockage is detected, then is raised exactly 0.250 inches above beam 12, so that it will not interfere with the similar positioning of other drills. It should be noted that the initial Y-axis positioning (to a point directly above the beam) could also be accomplished using the above-described method, if similar accuracy is required in this axis.

After this procedure has been repeated with the other nine drills 24, each drill will be located at a known position with respect to table 25 and can be operated in a programmed manner to drill holes to a desired depth at desired locations in 10 workpieces 32 which are placed on the table. Ten drills 24 can be automatically set to a desired height above table 25 within a tolerance of ±0.0002 inches in less than two minutes. Manually positioning drills 24 would require approximately 20 to 30 minutes of an operator's time, and equivalent uniformity of drill positioning would not be obtained.

Various embodiments and modifications of this invention have been described in the foregoing discussion and example, and further modifications will be apparent to those skilled in the art. Such modifications are included within the scope of the invention as defined by the following claims.

What is claimed is:

1. An apparatus for establishing a position of a tool or workpiece, said apparatus comprising:
   (a) means for positioning the tool or workpiece along an axis A;
   (b) means for providing a beam of coherent light along an axis which intersects axis A and is located so that the tool or workpiece can be positioned along axis A to at least partially block the beam;
   (c) means for sensing beam blockage by the tool or workpiece and for providing an electric signal corresponding to the amount of beam blockage; and
   (d) means for receiving said electric signal from the beam blockage sensing means and for controlling the positioning means in response to the signal so as to position the tool or workpiece out of blocking relationship with the beam.

2. The apparatus defined in claim 1, wherein the axis of the coherent light beam is perpendicular to axis A.

3. The apparatus defined in claim 1, further including means for positioning the tool or workpiece along an axis B, which is perpendicular to both axis A and the light beam axis.

4. The method defined in claim 1, wherein the coherent light beam is provided by a laser.

5. The apparatus defined in claim 1, wherein a second beam of coherent light is provided, along an axes parallel to the beam of (b), and located so that the tool or workpiece cannot block the second beam.

6. The apparatus defined in claim 5, wherein the sensing means of (c) produces a signal corresponding to the difference between intensities of the beam of (b) and the second beam.

7. An apparatus for establishing positions of a plurality of tools or workpieces, the apparatus comprising:
   (a) positioning means for independently positioning each tool or workpiece along parallel axes;
   (b) means for providing a beam of coherent light along an axis which is perpendicular to the axes of (a) and intersects the axes of (a), and is located so that each tool can be positioned by said positioning means to at least partially block the beam;
   (c) means for sensing beam blockage and for providing an electrical signal responsive thereto; and
   (d) means for receiving the electric signal from the beam blockage sensing means and for controlling said positioning means of (a) in response to the signal so as to cause the positioning of the tools or workpieces so that the beam is unblocked.

8. The apparatus defined in claim 7, further including means for positioning each tool or workpiece along parallel axes B, which are perpendicular to both the axes of (a) and the light beam axis.

9. The apparatus defined in claim 7, wherein a second beam of coherent light is provided, along an axes parallel to the beam of (b), and located so that the tools or workpieces cannot block the second beam.

10. The apparatus defined in claim 9, wherein the sensing means of (c) produces a signal corresponding to differences between intensities of the beam of (a) and the second beam.

11. An apparatus for establishing a position of a tool or workpiece, the apparatus comprising:
   (a) means for positioning the tool or workpiece along an axis A;
   (b) means for providing two parallel beams of coherent light along axes which are perpendicular to axis A, one of the beams being located so that it can be at least partially blocked by the tool or workpiece as the tool or workpiece is positioned along axis A;
   (c) means for detecting each parallel beam and producing an electric signal corresponding to differences between intensities of the parallel beams caused by the tool or workpiece being positioned so that it at least partially blocks one of the beams; and
   (d) means for receiving the signal of (c) and controlling the position means of (a) in response to the signal so as to cause the positioning means to position the tool or workpiece so that it unblocks said one beam.

12. The apparatus defined in claim 11, further including means for positioning the tool or workpiece aliong an axis B, which is perpendicular to both axes A and the axis of the light beams.

13. A method for positioning a tool or workpiece along an axis A, comprising:
   (a) moving the tool or workpiece along axis A until the tool or workpiece at least partially blocks a beam of coherent light having an axis perpendicular to axis A; and (b) moving the tool or workpiece to a point at which the beam just becomes unblocked.

14. A method for positioning plurality of tools or workpieces along respective parallel axes, comprising:
   (a) moving a first tool or workpiece along its axis until the tool at least partially blocks a beam of coherent light having an axis perpendicular to the parallel axes;
   (b) moving the first tool or workpiece to a point at which the beam just becomes unblocked; and
   (c) sequentially repeating steps (a) and (b) for each remaining tool or workpiece.

15. A method for positioning a tool or the like relative to a workpiece, the method comprising the steps of:
   (a) directing a beam of coherent light along a first axis which is at a known location relative to a workpiece or the like;
   (b) moving a tool or the like toward said light beam along a second axis which is fixed at a known angle relative to the first axis until the tool or the like encounters said light beam and causes at least a partial blocking thereof;
   (c) backing the tool or the like away from said light beam of along said second axis until the tool or the like is just clear of the light beam; and
   (d) continuing to back the tool or the like away from the light beam for a measured distance along the second axis, thereby establishing a second axis indexing position of the tool or the like.

16. The positioning method as claimed in claim 15 including the step of selecting the second axis to be orthogonal to the first axis.

17. The positioning method as claimed in claim 15 including the step of selecting the second axis to intersect the first axis.

18. The positioning method as claimed in claim 15 including the additional steps of:
   (i) moving the tool or the like toward the light beam along a third axis which is at a known angle relative to the first axis until the tool or the like encounters said light beam and causes at least partial blocking thereof;
   (ii) backing the tool or the like away from said light beam along said third axis until the tool or the like is just clear of the light beam; and
   (iii) continuing to back the tool or the like away from the light beam for a measured distance along the third axis, thereby establishing a third-axis indexing position of the tool or the like.

19. The positioning method as claimed in claim 18 including the step of selecting the third axis to be orthogonal to the first axis.

20. The positioning method as claimed in claim 18 including the step of selecting the third axis to be orthogonal to both the first and second axes.

21. A method for positioning a tool or the like relative to a workpiece, the method comprising the steps of:
   (a) directing a beam of coherent light along a first axis which is at a known location relative to a workpiece or the like;
   (b) moving a tool or the like, in first incremental steps, toward said light beam along a second axis which is fixed at a known angle relative to the first axis until the tool or the like encounters said light beam and causes at least a partial blocking thereof;
   (c) backing the tool or the like at least one of said first incremental steps away from said light beam along said second axis;
   (d) moving the tool or the like, in second incremental steps, back toward the first axis until the tool or the like encounters the light beam and causes at least a partial blocking thereof; and
   (e) backing the tool or the like at least one of said second incremental steps away from the light beam and then continuing to back the tool or the like away from the light beam for a measured distance along the second axis, thereby establishing a second-axis indexing position of the tool or the like.

22. The positioning method as claimed in claim 21 wherein the second incremental steps are substantially smaller than the first incremental steps.

23. Apparatus for positioning a tool or the like relative to a workpiece, the apparatus comprising:
   (a) a laser source for directing a beam of coherent light along a first axis which is at a known location relative to a workpiece or the like;
   (b) actuating means for moving a tool or the like toward said light beam along a second axis which is fixed at a known angle relative to the first axis until the tool or the like encounters said light beam and causes at least a partial blocking thereof;
   (c) means responsive to the tool or the like being positioned to at least partially block the light beam for causing the tool or the like to be backed away from said light beam of along said second axis until the tool or the like is just clear of the light beam; and
   (d) means for causing the tool or the like to continue to be backed away from the light beam for a measured distance along the second axis, thereby establishing a second-axis indexing position of the tool or the like.

24. The positioning apparatus as claimed in claim 23 wherein the second axis is orthogonal to the first axis.

25. The positioning apparatus as claimed in claim 23 wherein the second axis intersects the first axis.

26. Apparatus for positioning a tool or the like relative to a workpiece, the apparatus comprising:
   (a) a source of a beam of coherent light directed along a first axis which is at a known location relative to a workpiece or the like and a light detector aligned to detect said light beam;
   (b) tool moving means for moving a tool or the like, in first incremental steps, toward said light beam along a second axis which is fixed at a known angle relative to the first axis until the tool or the like encounters said light beam and causes at least a partial blocking thereof; and
   (c) control means responsive to the detector detecting said at least partial blocking of the light beam for causing the tool moving means to back the tool or the like at least one of said first incremental steps away from said light beam along said second axis, and for then causing the tool moving means to move the tool or the like, in second incremental steps, along the second axis back toward the light beam until the tool or the like again causes at least a partial blocking the light beam; said control means being then responsive to the detector detecting said at least partial blocking of the light beam for causing the tool moving means to back the tool or the like at least one of the second incremental steps away from the light beam and then to continue backing the tool or the like away from the light beam for a measured distance along the second axis, thereby establishing a second-axis indexing position of the tool or the like.

27. The positioning apparatus as claimed in claim 26 wherein the second incremental steps are substantially smaller then the first incremental steps.

28. The positioning apparatus as claimed in claim 26 including second tool moving means for moving the tool or the like toward the light beam along a third axis which is at a known angle relative to the first axis until the tool or the like encounters said light beam and causes at least partial blocking thereof, the control means then being responsive to the detector means detecting said at least partial blocking of the light beam for causing the second tool moving means to back the tool or the like away from said light beam along said third axis until the tool or the like is a measured distance from the light beam, thereby establishing a third-axis indexing position of the tool or the like.

29. The positioning apparatus as claimed in claim 28 wherein the third axis is orthogonal to the first axis.

30. The positioning apparatus as claimed in claim 28 wherein the third axis is orthogonal to both the first and second axes.

* * * * *

UNITED STATES PATENT AND TRADEMARK OFFICE
CERTIFICATE OF CORRECTION

PATENT NO. : 4,808,000
DATED      : February 28, 1989
INVENTOR(S): Robert L. Pasciak It is certified that error appears in the above-identified patent and that said Letters Patent is hereby corrected as shown below:

Column 6, line 60, change "aliong" to --along--.

Column 6, line 62, change "axis" to --axes--.

Signed and Sealed this

Eighteenth Day of September, 1990

Attest:

*Attesting Officer*

HARRY F. MANBECK, JR.

*Commissioner of Patents and Trademarks*